United States Patent
Eriksson et al.

[15] 3,670,065
[45] June 13, 1972

[54] PROCESS FOR PRODUCING DOSAGE UNITS OF A TYPE RESEMBLING TABLETS

[72] Inventors: Karl Gunnar Eriksson, Idunavgen 5, Lidingo; Arnold Mangen, Rosenborgsgatan 27, Karlstad, both of Sweden

[22] Filed: June 13, 1969

[21] Appl. No.: 833,184

Related U.S. Application Data

[63] Continuation-in-part of Ser. No. 677,653, Oct. 20, 1967, abandoned.

[30] Foreign Application Priority Data

June 19, 1968 Sweden.........................................8362

[52] U.S. Cl..................................264/131, 264/297, 424/19
[51] Int. Cl. .......................................................A61k 27/12
[58] Field of Search............................................424/19–22; 264/117, 131, 297

[56] References Cited

UNITED STATES PATENTS

| | | | |
|---|---|---|---|
| 3,061,510 | 10/1962 | Numerof et al............................ | 424/1 |
| 3,159,545 | 12/1964 | Kidwell et al.............................. | 424/1 |
| 3,297,804 | 1/1967 | Iwamoto et al......................... | 264/118 |
| 3,308,217 | 3/1967 | Lowy et al. ............................. | 264/117 |
| 3,374,146 | 3/1968 | Blicharz et al........................... | 424/19 |

*Primary Examiner*—Shep K. Rose
*Attorney*—Irons, Birch, Swindler & McKie

[57] ABSTRACT

Granules composed of a medicine and at least one substance delaying dissolution of the medicine in the gastrointestinal tract are incorporated in a melt of a carrier substance, said dissolution-delaying substance(s) having a higher melting temperature than the carrier substance and remaining all the time unmolten in the melt, said melt with its unmolten granules then being formed into dosage units by mere casting in casting moulds. Medicine particles without dissolution-delaying substance may additionally be incorporated in the melt and/or in a surface layer on the dosage units.

7 Claims, No Drawings

PROCESS FOR PRODUCING DOSAGE UNITS OF A TYPE RESEMBLING TABLETS

This application is a continuation-in-part of our earlier copending application Serial No. 677,653, filed Oct. 20, 1967 and now abandoned, entitled "Process For Producing Dosage Units of Medicines in Solid Forms."

This invention relates to a process for producing dosage units which resemble tablets in their appearance.

In the art of manufacturing medical preparations having a prolonged or delayed therapeutic action it has been previously proposed to enclose granules in capsules, the granules containing a medicine and being either uncoated or coated with a protective coating that delays dissolution in the gastrointestinal tract. Such capsules have the drawback that when they are dissolved in the gastrointestinal tract the granules enclosed therein are exposed all at the same time. Therefore, in cases where the effect of the medicine is to be spread over a longer time, it is necessary to introduce into each capsule a great number of different groups of granules, as for example one group having a thin protective coating, one group having a thicker coating (to thus cause a greater delay in the exposure of the medicine), one group having a still thicker coating etc. The manufacturing process will thus become laborious and require considerable time, and nevertheless it will even so hardly ever result in the effect that the drug particles are dissolved out in a really uniform and continuous succession one after the other.

Furthermore, attempts have been made heretofore to embed the active medicinal substance in tablets, said substance being introduced in finely divided form into the tabletting mass and/or being prior to the tabletting operation converted to various forms of granules coated or mixed with substances delaying the dissolution of the medicine in the gastrointestinal tract. However, such tablets are also unsatisfactory. Very often the cohesion of such a tablet is poor, and the use of an ordinary tabletting machine in the manufacture of medical compositions as contemplated here involves substantial difficulties, there being no technical means, at this stage, to ensure that the pressure exerted is exactly the same for each individual tablet. The porosity will therefore vary in an undesirable manner from tablet to tablet, and consequently different tablets will show different extraction behavior when coming into contact with the gastrointestinal fluids. Moreover many of the dissolution-delaying substances employed for bringing about the prolonged therapeutic action are of such a type (for instance fatty substances) as to seriously thwart manufacture in a normal tabletting process, for example due to such phenomena as sticking of the mass to the tabletting tools or crushing of the protective layers on the granules.

These disadvantages and difficulties are overcome by the process according to the present invention which, too, comprises incorporation of small granules (for example small grains, spheres, pellets or powder particles) into the carrier substance from which the dosage units are to be formed, all of said granules containing (a) a small portion of the medicine (that is of the active medicinal ingredient of the dosage unit to be formed) and (b) at least one substance delaying the dissolution of the medicine in the gastrointestinal tract. The carrier substance from which the dosage unit is to be formed is of a type such that it can be converted to the molten state by heating, its melting temperature being usually within the range of from 37° C to 150° C, preferably within the range of from 43° C to 100° C. The chief characteristic feature of the process according to this invention resides in the steps of first forming said granules by mixing or coating said portions of medicine with a specifically chosen substance or mixture of substances of the aforesaid dissolution-delaying type, namely such a substance or mixture that has a melting temperature exceeding that of the carrier substance by at least 2° C, preferably by at least 5° C, then, in order to form the mass from which the dosage units are to be shaped, mixing said granules uniformly into a melt of the carrier substance, said melt having a temperature below that at which the substance or substances delaying dissolution will melt and having if desired further small portions of medicine admixed therein without any dissolution-delaying substance, and then pouring the resultant mass, also at a temperature at which the carrier substance is in the form of a melt but contains said granules in a non-molten state, into casting moulds having mould cavities that correspond to the shape and size of the dosage units desired, the dosage units thus formed being then, after having cooled, removed from the mould cavities and if desired coated with a surface layer containing further small portions of medicine in a finely divided state. This latter step, if applied, will as a rule involve coating with an ordinary finishin mass (dragee mass) in which particles of medicine have been incorporated.

The aforesaid substance or mixture of substances that delays dissolution will below be referred to simply as "auxiliary substance".

When dosage units are produced in accordance with this process the absorption of the medicine in the gastrointestinal tract can be controlled in a highly satisfactory and adaptable manner without necessitating any particularly complicated steps of manufacture. The release of the medicine takes place partly in that the medicine is dissolved out from the granules lying near the surface of the dosage unit and partly due to the fact that granules are exposed successively after one another and medicine is dissolving out therefrom. By a suitable choice of auxilaiary substance and carrier substance these two phenomena can be regulated so as to result in a medicine release that has a particularly high degree of uniformity and proceeds in a continuous manner over a desired period of time. In case that "free" medicine (that is, medicine without auxiliary substance) is present in the interior of the dosage unit and/or as an extra surface layer of the dosage unit, the dissolution of those free medicine particles in the gastrointestinal tract will start prior to the dissolution of the aforesaid granules which contain auxiliary substance in addition to medicine. These embodiments will be suitable in cases where a more or less great initial dosing is desired. However, this is not at all always the case; often the desideratum will be to attain a very uniform depot action spread over a certain time. In such cases no free medicine but only the small granules should be incorporated. These granules lie uniformly distributed in each dosage unit and in an entirely undamaged state, due to the fact that the unit has been produced by a casting operation, and all the while during the progressive decomposition of the carrier substance in the gastrointestinal tract more and more granules will be exposed in succession and will also, due to the presence of the auxiliary substance, be extracted in a progressive manner so that the release of the medicine in the gastrointestinal tract will proceed very uniformly and continuously.

Theoretically, a similarly good effect might be obtained also with the aforesaid tablets of the conventional compressed type. In actual practice, however, such tablets give much less satisfactory results, inter alia because the tabletting operation will always involve exertion of mechanical force on the material which may give rise to deformation or crushing of the granules. Crushing will cause very serious disruptions in the desired uniform course of medicine absorption in the gastrointestinal tract, due to premature dissolution of the disintegrated granules. The same applies to deformed granules which have been wholly or partially deprived of their protection due to the deformation. Granules containing fat are particularly liable to deformation. In addition to these disadvantages the compressed tablets have the further drawbacks of varying porosity and non-uniform cohesion which constitute additional factors for disrupting the desired uniform effect, for instance in that medicine portions in carcks or fractured surfaces of the tablet will be absorbed prematurely.

Further advantages of the aforesaid casting technique reside in its being simple, facilitating fine dispersion of the active ingredients and maintaining the high degree of dispersion obtained, and moreover avoiding the aforesaid difficulties arising in the manufacture of compressed tablets.

As mentioned above, the carrier substance should have a melting point above 37° C; still more preferably, it has a melting point above 40° C, it being undesirable that the dosage unit melts at body temperature. A carrier substance having a melting point not below 43° C is most preferred. For the purpose of obtaining good casting properties, the carrier substance should usually be present in an amount not less than 20 percent of the weight of the dosage unit, although in exceptional cases good shaping properties can be obtained with as little as 10 percent of carrier substance. A very wide range of substances and mixtures thereof may be employed as carrier substance, the only limitation being that said carrier substance must be of a pharmaceutically acceptable kind and should have a melting point not below 37° C, preferably not below 43° C and furthermore preferably not higher than about 150° C because the risk that heat-sensitive medicinal components may be affected undesirably will increase at higher temperatures. Furthermore, the carrier substance should be of such a kind that it is acted upon by the gastrointestinal fluids so as to be dissolved or so as to be softened in such a manner that under slight pressure it will decompose within the time period during which the dosage unit is to be effective. Substances of water-soluble as well as of fat-soluble type may be employed. Examples of water-soluble substances are condensation products of ethylene glycol such as for instance substances of the formula $H(OCH_2 \cdot CH_2)_n OH$ where n is a number of from 5 to 400, preferably within the range of 60–200, and condensation polymers of propylene glycol, propylene oxide and ethylene oxide in which the polyoxyethylene portion amounts to at least 50 percent by weight. Examples of fat-soluble substances that are suitable as carrier substance either alone or in admixtures with one another are condensation polymers of propylene glycol, propylene oxide and ethylene oxide in which the polyoxyethylene portion amounts to less than 50 percent by weight, paraffin, hydrogenated vegetable oils, stearic acid, cetyl alcohol, stearyl alcohol, and fatty acid esters such as for instance glycerol monostearate.

The medicine constituting the active medicinal ingredient in the dosage unit may consist of one of more active medicinal substances. These may be incorporated in the carrier substance in the form of granules produced for instance by spraying and cooling a mass obtained by dissolving and/or slurrying the medicinal substances in a melt of for instance polyethylene-containing paraffin, or may be incorporated in the carrier in the form of for instance such granules that have been produced by granulation in a fluidized bed or in some conventional manner in mixing vessels. The auxiliary substances employed for delaying dissolution of the medicinal component must be pharmaceutically acceptable and should be such that they remain unaffected or substantially unaffected when the granules are worked into the warm or hot mass which is to be cast. This is why the auxiliary substance must have the aforesaid higher melting temperature. It has been found feasible to employ fatty substances, for instance solid paraffin, stearic acid, glycerol monostearate, as said auxiliary substance also when the carrier substance itself consists wholly or partially of fatty substances. This is a matter of great practical convenience - although of course it must always be observed that the auxiliary substance must be one of a melting point which is by at least 2° C and preferably by at least 5° C higher than that of the carrier substance - because it facilitates choosing non-expensive, non-toxic and well-known substances and provides for the possibility of choosing both the carrier and the auxiliary substance from a very broad and satisfactory range of substances so that in each individual case the most desirable combination of substances may be selected from said broad range. It should be noted, also, that both the carrier substance and the auxiliary substance may each consist of one of one or more substances. The method of preparing the granules by spraying and cooling, in which the medicine is mixed into a melt of for instance solid paraffin and low molecular polyethylene, has been found to be very suitable when effected with normal spraying tools of the type as employed in spray painting, to give the desired droplet size. The solubility properties of the medicinal component can be varied within wide limits solely by drop size regulation. Other feasible methods of producing the granules are, for instance, centrifugation carried out with the same (paraffin + low molecular polyethylene) or other auxiliary substances.

A suitable size of the granules is within the range of 80 micron to 2.5 mm, preferably 500–800 micron. The medicine particles present in the granules and also any such "free" medicine particles (see above) that may if desired be incorporated in the carrier substance and/or in a surface layer applied after the casting will preferably have a size of 1–50 micron, although they may be larger; but preferably they should have a size of less than 1 mm. However, in cases where such free particles are incorporated it should be noted that at least 10 percent by weight and preferably at least 50 percent by weight of the medicine should be present in the granules (that is, in the auxiliary substance plus medicine combination), based on the total weight of active medicine in the dosage unit. If free medicine particles are incorporated in an outer surface layer (which is of course only an optional layer and if applied is applied after the casting operation) they will as a rule amount to about 5–50 percent by weight of the total amount of medicine in the dosage unit, and will preferably be about 10–25 percent by weight.

The medicine which as pointed out above may consist of either one active medicinal substance or a plurality of active medicinal substances is usually incorporated in such quantity that it will amount to about 0.05–60 percent by weight, preferably about 5–30 percent by weight, of the total dosage unit.

The number of granules in the dosage unit may vary within wide ranges; the lower range limit is determined inter alia by the dosing accuracy required. For instance, it is possible to introduce into each dosage unit as few as 10 granules, but much greater numbers are also contemplated within the scope of this invention for instance up to several thousands; however, the dosage unit as a whole should preferably not weigh more than about 1 gram.

The casting may be effected in moulds of any suitable type. In particular, it may be performed with a pair of rollers having mould cavities in their surfaces of the type described in our earlier application Ser. No. 677,653 and corresponding French patent 1,545,977, issued Oct. 7, 1968 or as described in U.S. Pat. 2,874,417, issued Feb. 24, 1959.

The present invention provides for a possibility of harmonizing the pharmacological effects of several different medicines particularly well. It is a known fact that different medicinal substances may differ from one another with respect to the length of their duration, due to different rates of absorption from the gastrointestinal tract to the blood, different degrees of bonding to blood proteins and different rates of elimination. As a consequence, the times during which different substances are effective may be at great discrepancy also when, from a therapeutic point of view, it is desired that these substances should be administered simultaneously and should be of equal duration. Such problems, too, can be solved with the aid of the present process according to this invention much more satisfactorily than heretofore, it being possible to choose suitable auxiliary substances for this process so as to better "synchronize" the activities of the individual medicines incorporated in a dosage unit. The physiologically active compound 2-(diphenylmethoxy)-N,N-dimethyl-ethyl-ammonium chloride (short name "Diphenhydramine hydrochloride") is an example of a long duration substance. It has been widely used as an anti-nauseatic drug despite its concomitant hypnotic effect. This secondary effect can be eliminated to a certain extent by a caffein addition, but since the duration of the caffein effect is relatively short it has not been possible up to now to fully utilize the advantages of this medicinal combination in the form of a single tablet; for if granules are embedded in compressed tablets it is impossible to avoid the risk of some granules dissolving prematurely. By the process of the present invention, on the other hand, it is possible to modify the release of the caffein in such a manner that the caffein becomes exposed to the absorptive surface of the intestine during a longer period of time than the 2-(diphenylmethoxy)-N,N-dimethyl-ethyl-ammonium chloride although these two components are incorporated together in a single dosage unit.

Another advantage inherent in the dosage units produced according to this invention resides in their providing an excellent storage milieu for e.g. such medicinal ingredients that are sensitive to moisture and humidity. This is so because the casting operation permits avoidance of undesirable porosity to an infinitely greater extent than the conventional tabletting methods. It may be mentioned furthermore that while an often encountered difficulty with tablets produced in a conventional manner is that they do not easily lend themselves to being coated with a thin colored coat for making them aesthetically attractive, there is no such difficulty arising with the dosage units produced according to the present invention: In the process of this invention, it is possible to simply add a desired coloring material to the molten mass to be cast, and then afterwards apply a colorless film dragee coating by a conventional uncomplicated technique.

Aromatizing may sometimes be desirable in order to disguise unpleasant smell. In conventional tablets with their inevitable air-filled pores such aromatizing involves difficulties since the aroma substances are volatile and liable to be destroyed under the influence of the oxygen of the air. Fully satisfactory results have not even been obtained when the prior art tablets have been subjected to an aromatization localized to their sugar or film coating, as has been done in some cases. The present invention provides for better aromatization possibilities due to the fact that the dosage units produced are not porous. For instance, one or more aroma substances may be admixed with the carrier substance; it should be noted in this connection that many aroma substances will tolerate short time heating to relatively high temperatures without appreciable deterioration of their properties, and therefore it is quite a feasible way of proceeding to distribute them uniformly in the mass to be cast - and after the casting, a durably aromatized product is obtained.

Examples of medicines that may be used in the process of the present invention and are stable under the conditions employed are penicillin, acetyl salicylic acid, lithium sulphate, potassium chloride, ferrous sulphate, ascorbic acid, ephedrin chloride, 2-(diphenylmethoxy)-N,N-dimethyl-ethyl)-ammonium chloride, caffein, papaverin chloride and mixtures thereof.

The invention is further illustrated by the below examples to which however its scope is not restricted in any way. All the percentages in these examples are percent by weight. Example 1 illustrates the invention when utilized with a substance slowly dissolving in the gastrointestinal tract, namely dried ferrous sulphate, whereas Example 2 illustrates the invention when utilized with a substance that dissolves quickly, namely potassium chloride.

EXAMPLE 1

| Components | % |
|---|---|
| Ferrous sulphate, dried powder | 25 |
| Polyethylene glycol (average molecular weight 6000) | 61.5 |
| Hydrogenated castor oil | 13.5 |

The hydrogenated castor oil is melted at about 90° C and admixed with the ferrous sulphate. The warm melt is run through a three-roller mill and then sprayed into cold air with a spray gun of the paint sprayer type, having an opening of about 2 mm. The powder thus obtained, that is, the granules, are slurried in a melt of the polyethylene glycol heated to about 65° C and maintained at t this temperature while being fed into the nip between a pair of rollers having mould cavities in their peripheries, the melt being maintained agitated so as to ensure homogeneousness. The rollers are cooled to a temperature of between −2 and +2° C. The dosage units thus produced weighed 1 gm.

These dosage units were tested according to the so-called cup method which involves the following procedure: 20 dosage units are placed into a 600 cc cup into which then 500 cc extraction liquid at 37° C is introduced. The contents of the cup are stirred, and the percentage of the medicine content dissolved out from the dosage units is recorded at successive time intervals. The temperature is maintained at 37° C all the time. In the present case, a 1 percent Tween 80 solution was employed as extracting agent, and the rate of stirring was 50 revolutions per minute. (Tween 80 is polyoxyethylene sorbitan monooleate.) 93 percent of the ferrous sulphate was found to have been extracted after 6 hours, so on an average 15.5 percent of the ferrous sulphate was extracted per hour. In the samples taken each hour it was found that each hour 15.5 percent ± 4.5 percent of the ferrous sulphate had been extracted.

EXAMPLE 2

| Components | % |
|---|---|
| Potassium chloride | 24 |
| Polyethylene glycol (average molecular weight 6000) | 59.7 |
| Glycerol monostearate | 0.3 |
| Paraffin, microcristalline | 14.4 |
| Polyethylene (average molecular weight 11000) | 1.6 |

The potassium chloride is ground to an average particle size of about 40 micron and mixed into a melt of the polyethylene and paraffin, said melt having been heated to about 100° C, and then the mixture is run through a three-roller mill, whereupon the mixture is sprayed and cooled in the same manner as in Example 1. The granules are mixed into a melt of the polyethylene glycol and the glycerol monostearate, said melt being maintained at about 65° C. Then dosage units are formed in the mould cavities of the aforesaid rollers. When the dosage units thus obtained were examined according to the above-described cup method with a 1 percent Tween 80 solution as extraction liquid it was found that 96 percent of the potassium chloride had been extracted after 4.5 hours. A graph of the extraction results which was drawn up on the basis of four measuring points distributed approximately uniformly (1 hr., 2 hrs, 3.25 hrs and 4.5 hrs resp.) showed that during the first hour 25 percent of the potassium chloride content were extracted, during the second hour 22 percent were extracted, during the third hour 20 percent were extracted and during the fourth hour again 20 percent were extracted.

It should be appreciated that this invention is not restricted to the particular embodiments described above but that many modifications may be made without transgression of the scope and spirit of this invention.

We claim:

1. In a process for producing dosage units of medicines in solid form, in which an active medicinal ingredient comprising at least one active medicine is mixed with a first carrier substance which is solid at room temperature but liquid at an elevated temperature, and the dosage units are prepared from the mixture thus obtained, by the plurality of steps which can comprise feeding said mixture, while at a temperature at which said carrier substance forms a melt containing said active medicinal ingredients, into cavities which define moulds, said cavities being dimensioned so that said moulds correspond to the desired dimensions of the dosage units, flowing said melt into said moulds so as to fill them, cooling the surfaces of said moulds to a temperature low enough to cause said carrier substance to solidify inside said moulds, and discharging the dosage units thus obtained from said moulds, the improvement that comprises preforming granules by combining said medicinal ingredients with at least one second substance selected from the group consisting of paraffin, polyethylene-containing paraffin, hydrogenated vegetable oils, fatty acids and fatty acid esters, having a melting temperature at least 2° C higher than that of said first carrier substance and capable of delaying dissolution of said medicinal ingredient in the gastrointestinal tract, said first carrier substance having a melting temperature within the range of 37–150°$BH$ C and being selected from the group consisting of water soluble polyethylene glycols, water soluble polyethylene propylene glycols, and mixtures thereof, fat soluble polyethylene propylene glycols, paraffin, hydrogenated vegetable oils, fatty acids, fatty alcohols and fatty acid esters, that then a mass to be shaped into dosage units is formed by mixing said granules uniformly into a melt of said first carrier substance, said melt being maintained at a temperature below the melting temperature of said second dissolution-delaying substance, and that the mass thus formed is introduced, while being maintained at a temperature at which the first carrier substance is in the form of a melt but contains said granules in a non-molten state, into casting moulds having mould cavities corresponding to the shape and size of the dosage units to be produced, the melt being maintained agitated so as to insure homogeneousness, the dosage units thus obtained being allowed to cool and solidify in the mould cavities and then being removed from the mould cavities.

2. A process according to claim 1, in which said granules are formed by mixing said medicinal ingredient with said second dissolution-delaying substance.

3. A process according to claim 1, in which said granules are formed by coating said medicinal ingredient with said second dissolution-delaying substance.

4. A process according to claim 1, in which said second dissolution-delaying substance has a melting temperature at least 5° C higher than that of said first carrier substance.

5. A process according to claim 1, in which additional small portions of medicinal ingredient without said second dissolution-delaying substance are mixed into the melt prior to the introduction of said mass into said casting moulds.

6. A process as claimed in claim 1, in which the dosage units removed from the mould cavities are coated out of mould with a surface layer containing additional small portions of medicinal ingredient in a finely divided state.

7. A process as claimed in claim 1, in which said first carrier substance has a melting temperature within the range of 43–100°$BH$ C.

* * * * *

UNITED STATES PATENT OFFICE
CERTIFICATE OF CORRECTION

Patent No. 3,670,065          Dated June 13, 1972

Inventor(s) Karl Gunnar Eriksson, et al

It is certified that error appears in the above-identified patent and that said Letters Patent are hereby corrected as shown below:

Column 7, line 9, "delete "BH". Column 8, line 22, delete "BH".

Signed and sealed this 31st day of October 1972.

(SEAL)
Attest:

EDWARD M. FLETCHER, JR.          ROBERT GOTTSCHALK
Attesting Officer                 Commissioner of Patents